United States Patent [19]
Hiratani

[11] Patent Number: 6,015,874
[45] Date of Patent: Jan. 18, 2000

[54] CROSSLINKABLE COMPOUND AND AN OPTICAL MATERIAL EMPLOYING IT

[75] Inventor: Haruyuki Hiratani, Kasugai, Japan

[73] Assignee: Menicon Co., Ltd., Nagoya, Japan

[21] Appl. No.: 09/178,427

[22] Filed: Oct. 26, 1998

[30] Foreign Application Priority Data

Oct. 29, 1997 [JP] Japan ..................................... 9-297268

[51] Int. Cl.[7] .................................................. C08G 75/20
[52] U.S. Cl. ........................ 528/391; 528/367; 528/422; 525/191; 525/212; 525/218; 525/242
[58] Field of Search .................................... 528/391, 367, 528/422; 525/191, 212, 218, 242

[56] References Cited

U.S. PATENT DOCUMENTS 4,250,322  2/1981  Efimov et al. ............................ 560/26

OTHER PUBLICATIONS

Chem Abstracts: 123:34701 "Pervaporation separatism of water ethanol mixture through the Membrane of Poly(Thio-etheramide)s Prepared from aromatic amide and 1,4–Benzenedithiol" E12 et al.

111:215015 "Novel Synthesis of Polycinnamanides by Pd. Catalized C–C Coupling Polycondensation of Bisacrylamides w/aromatic diiodes" Masaru et al.
95: 8009 "Oligourethracrylates" Yu M. et al.
84: 136261 "Oligourethane acrylates" "Kokai".
84:44938 "Oligourethane acrylates Kalim".
80: 83868 "Oligourethane acrylates and Polymers based on them A.A. et al.".

*Primary Examiner*—Duc Truong
*Attorney, Agent, or Firm*—Oblon, Spivak, McClelland, Maier & Neustadt, P.C.

[57] ABSTRACT

A novel crosslinkable compound of the formula (I):

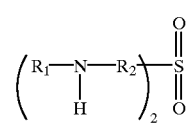

and an optical material prepared by employing such a crosslinkable compound, which is excellent in hydrophilicity, transparency, ultraviolet light absorbing property, deposit resistance and boiling resistance and yet has proper hardness and oxygen permeability.

6 Claims, No Drawings

CROSSLINKABLE COMPOUND AND AN OPTICAL MATERIAL EMPLOYING IT

The present invention relates to a crosslinkable compound and an optical material employing it. More particularly, it relates to a novel crosslinkable compound suitable for use to obtain a material which is hydrophilic and has excellent properties such that it is excellent not only in hydrophilicity and transparency but also in ultraviolet absorbing property, deposit resistance and boiling resistance and has proper hardness and oxygen permeability, particularly for an ocular lens material such as a contact lens material or an intraocular lens material, an artificial cornea material, a material for eye glasses or a material for goggles, and an optical material obtained by using such a crosslinkable compound and having the above-mentioned excellent properties.

Among optical materials, an ocular lens material to be used for an ocular lens such as a contact lens or an intraocular lens, is usually required to have excellent oxygen permeability, excellent transparency and proper hardness.

In particular, for example, when a hard oxygen permeable ocular lens material is to be obtained, it is common to employ a silicone-containing component in order to improve the oxygen permeability. When such a silicone-containing component is employed, it is certainly possible to obtain an ocular lens material excellent in oxygen permeability, but such an ocular lens material has a drawback that it is poor in the surface wettability (wettability to tears). If a contact lens made of such an ocular lens material poor in the surface wettability, is put on an eye, there will be a problem that a trouble such as a dry eye or dry feeling tends to occur frequently.

The present invention has been made in view of the above-mentioned prior art, and it is an object of the present invention to provide an optical material for e.g. an ocular lens material, which is excellent not only in hydrophilicity and transparency but also in ultraviolet absorbing property, deposit resistance and boiling resistance and yet has proper hardness and oxygen permeability, and a novel crosslinkable compound useful to obtain such an optical material for e.g. an ocular lens material having such excellent properties.

The present invention provides:

① A crosslinkable compound of the formula (I):

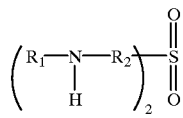

(I)

wherein $R_1$ is a group of the formula:

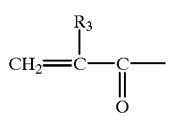

wherein $R_3$ is a hydrogen atom or a methyl group; a group of the formula:

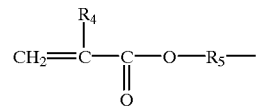

wherein $R_4$ is a hydrogen atom or a methyl group, and $R_5$ is a direct bond, a group of the formula:

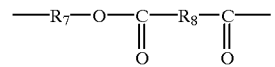

wherein $R_7$ is a $C_{1-5}$ alkylene group, and $R_8$ is —$CH_2$—$CH_2$—, —CH=CH—, a group of the formula:

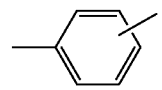

or a group of the formula:

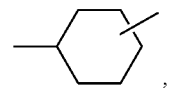

or a group of the formula:

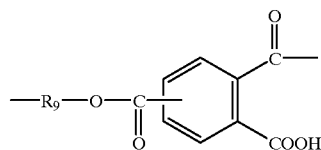

wherein $R_9$ is a $C_{1-5}$ alkylene group; or a group of the formula:

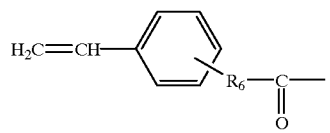

wherein $R_6$ is a $C_{1-3}$ alkylene group; and $R_2$ is a group of the formula:

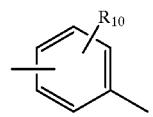

wherein $R_{10}$ is a hydrogen atom, a methyl group, a methoxy group, a chlorine atom or a hydroxyl group; or a group of the formula:

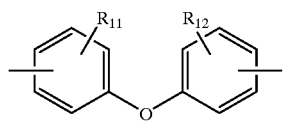

wherein each of $R_{11}$ and $R_{12}$ which are independent of each other, is a hydrogen atom, a methyl group, a methoxy group, a chlorine atom or a hydroxyl group, and ② An optical material made of a polymer obtained by polymerizing polymerizable components comprising said crosslinkable compound and at least one monomer having an unsaturated double bond copolymerizable with the crosslinkable compound.

Now, the present invention will be described in detail with reference to the preferred embodiments.

As mentioned above, the crosslinkable compound of the present invention is a compound of the formula (I):

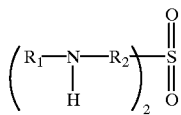
(I)

wherein $R_1$ is a group of the formula:

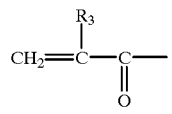

wherein $R_3$ is a hydrogen atom or a methyl group; a group of the formula:

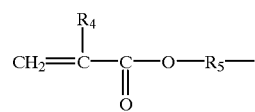

wherein $R_4$ is a hydrogen atom or a methyl group, and $R_5$ is a direct bond, a group of the formula:

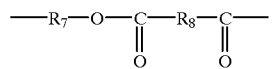

wherein $R_7$ is a $C_{1-5}$ alkylene group, and $R_8$ is —$CH_2$—$CH_2$—, —$CH=CH$—, a group of the formula:

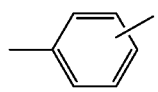

or a group of the formula:

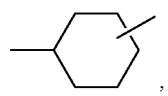

or a group of the formula:

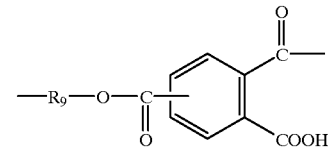

wherein $R_9$ is a $C_{1-5}$ alkylene group; or a group of the formula:

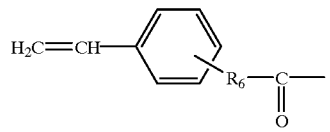

wherein $R_6$ is a $C_{1-3}$ alkylene group; and $R_2$ is a group of the formula:

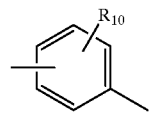

wherein $R_{10}$ is a hydrogen atom, a methyl group, a methoxy group, a chlorine atom or a hydroxyl group; or a group of the formula:

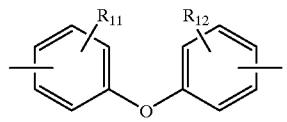

wherein each of $R_{11}$ and $R_{12}$ which are independent of each other, is a hydrogen atom, a methyl group, a methoxy group, a chlorine atom or a hydroxyl group.

The crosslinkable compound of the above formula (I) is a compound which has two polymerizable unsaturated double bonds and thus exhibits a crosslinking ability when polymerized together with other monomer. Further, a hydrophilic group is present in the compound, and a polymer obtainable by employing the compound will have an excellent hydrophilic nature imparted, will have the contact angle reduced and further will have excellent transparency, ultraviolet absorbing property, deposit resistance and boiling resistance as well as proper hardness and oxygen permeability imparted.

Specific examples of the crosslinkable compound include bis[4-(3-(meth)acrylamidophenoxy)phenyl]sulfone, bis[4-(4-(meth)acrylamidophenoxy)phenyl]sulfone, bis[4-(2-(meth)acrylamidophenoxy)phenyl]sulfone, bis[3-(3-(meth)acrylamidophenoxy)phenyl]sulfone, bis[3-(4-(meth)acrylamidophenoxy)phenyl]sulfone, bis[3-(2-(meth)acrylamidophenoxy)phenyl]sulfone, bis[4-(meth)acrylamidophenyl]sulfone, bis[3-(meth)acrylamidophenyl]sulfone, bis[2-(meth)acrylamidophenyl]sulfone, bis[(4-(meth)acrylamido-3-methyl)phenyl]sulfone, bis[(4-(meth)acrylamido-3-hydroxy)phenyl]sulfone, bis[(4-(meth)acrylamido-3-chloro)phenyl]sulfone, bis[(4-(meth)acrylamido-3-methoxy)phenyl]sulfone, bis[4-(3-methyl-4-(meth)acrylamidophenoxy)phenyl]sulfone, bis[4-(3-hydroxy-4-(meth)acrylamidophenoxy)phenyl]sulfone, bis

[4-(3-chloro-4-(meth)acrylamidophenoxy)phenyl]sulfone, bis[4-(3-methoxy-4-(meth)acrylamidophenoxy)phenyl]sulfone, bis[4-(3-(2-(meth)acryloyloxyethyl)-hexahydrophthalamidophenoxy)phenyl]sulfone, bis[4-(4-(2-(meth)acryloyloxyethyl)hexahydrophthalamidophenoxy)-phenyl]sulfone, bis[4-(2-(2-(meth)acryloyloxyethyl)hexahydrophthalamidophenoxy)-phenyl]sulfone, bis[3-(3-(2-(meth)acryloyloxyethyl)hexahydrophthalamidophenoxy)-phenyl]sulfone, bis[3-(4-(2-(meth)acryloyloxyethyl)hexahydrophthalamidophenoxy)-phenyl]sulfone, bis[3-(2-(2-(meth)acryloyloxyethyl)hexahydrophthalamidophenoxy)-phenyl]sulfone, bis[4-(2-(meth)acryloyloxyethyl)hexahydrophthalamidophenyl]-sulfone, bis[3-(2-(meth)acryloyloxyethyl)hexahydrophthalamidophenyl]-sulfone, bis[2-(2-(meth)acryloyloxyethyl)hexahydrophthalamidophenyl]-sulfone, bis[(4-(2-(meth)acryloyloxyethyl)hexahydrophthalamido-3-methyl)phenyl]sulfone, bis[(4-(2-(meth)acryloyloxyethyl)hexahydrophthalamido-3-hydroxy)phenyl]sulfone, bis[(4-(2-(meth)acryloyloxyethyl)hexahydrophthalamido-3-chloro)phenyl]sulfone, bis[(4-(2-(meth)acryloyloxyethyl)hexahydrophthalamido-3-methoxy)phenyl]sulfone, bis[4-(3-methyl-4-(2-(meth)acryloyloxyethyl)hexahydrophthalamidophenoxy)-phenyl]sulfone, bis[4-(3-hydroxy-4-(2-(meth)acryloyloxyethyl)hexahydrophthalamidophenoxy)-phenyl]sulfone, bis[4-(3-chloro-4-(2-(meth)acryloyloxyethyl)hexahydrophthalamidophenoxy)-phenyl]sulfone, bis[4-(3-methoxy-4-(2-(meth)acryloyloxyethyl)hexahydrophthalamidophenoxy)-phenyl]sulfone, bis[4-(3-(2-(meth)acryloyloxyethyl)succinamidophenoxy)phenyl]sulfone, bis[4-(4-(2-(meth)acryloyloxyethyl)succinamidophenoxy)phenyl]sulfone, bis[4-(2-(2-(meth)acryloyloxyethyl)succinamidophenoxy)phenyl]sulfone, bis[3-(3-(2-(meth)acryloyloxyethyl)succinamidophenoxy)phenyl]sulfone, bis[3-(4-(2-(meth)acryloyloxyethyl)succinamidophenoxy)phenyl]sulfone, bis[3-(2-(2-(meth)acryloyloxyethyl)succinamidophenoxy)phenyl]sulfone, bis[4-(2-(meth)acryloyloxyethyl)succinamidophenyl]sulfone, bis[3-(2-(meth)acryloyloxyethyl)succinamidophenyl]sulfone, bis[2-(2-(meth)acryloyloxyethyl)succinamidophenyl]sulfone, bis[(4-(2-(meth)acryloyloxyethyl)succinamido-3-methyl)phenyl]sulfone, bis[(4-(2-(meth)acryloyloxyethyl)succinamido-3-hydroxy)phenyl]sulfone, bis[(4-(2-(meth)acryloyloxyethyl)succinamido-3-chloro)phenyl]sulfone, bis[(4-(2-(meth)acryloyloxyethyl)succinamido-3-methoxy)phenyl]sulfone, bis[4-(3-methyl-4-(2-(meth)acryloyloxyethyl)succinamidophenoxy)phenyl]sulfone, bis[4-(3-hydroxy-4-(2-(meth)acryloyloxyethyl)succinamidophenoxy)phenyl]sulfone, bis[4-(3-chloro-4-(2-(meth)acryloyloxyethyl)succinamidophenoxy)phenyl]sulfone, bis[4-(3-methoxy-4-(2-(meth)acryloyloxyethyl)succinamidophenoxy)phenyl]sulfone, bis[4-(3-(2-(meth)acryloyloxyethyl)phthalamidophenoxy)phenyl]sulfone, bis[4-(4-(2-(meth)acryloyloxyethyl)phthalamidophenoxy)phenyl]sulfone, bis[4-(2-(2-(meth)acryloyloxyethyl)phthalamidophenoxy)phenyl]sulfone, bis[3-(3-(2-(meth)acryloyloxyethyl)phthalamidophenoxy)phenyl]sulfone, bis[3-(4-(2-(meth)acryloyloxyethyl)phthalamidophenoxy)phenyl]sulfone, bis[3-(2-(2-(meth)acryloyloxyethyl)phthalamidophenoxy)phenyl]sulfone, bis[4-(2-(meth)acryloyloxyethyl)phthalamidophenyl]sulfone, bis[3-(2-(meth)acryloyloxyethyl)phthalamidophenyl]sulfone, bis[2-(2-(meth)acryloyloxyethyl)phthalamidophenyl]sulfone, bis[(4-(2-(meth)acryloyloxyethyl)phthalamido-3-methyl)phenyl]sulfone, bis[(4-(2-(meth)acryloyloxyethyl)phthalamido-3-hydroxy)phenyl]sulfone, bis[(4-(2-(meth)acryloyloxyethyl)phthalamido-3-chloro)phenyl]sulfone, bis[(4-(2-(meth)acryloyloxyethyl)phthalamido-3-methoxy)phenyl]sulfone, bis[4-(3-methyl-4-(2-(meth)acryloyloxyethyl)phthalamidophenoxy)phenyl]sulfone, bis[4-(3-hydroxy-4-(2-(meth)acryloyloxyethyl)phthalamidophenoxy)phenyl]sulfone, bis[4-(3-chloro-4-(2-(meth)acryloyloxyethyl)phthalamidophenoxy)phenyl]sulfone, bis[4-(3-methoxy-4-(2-(meth)acryloyloxyethyl)phthalamidophenoxy)phenyl]sulfone, bis[4-(3-(2-(meth)acryloyloxyethyl)fumaramidophenoxy)phenyl]sulfone, bis[4-(4-(2-(meth)acryloyloxyethyl)fumaramidophenoxy)phenyl]sulfone, bis[4-(2-(2-(meth)acryloyloxyethyl)fumaramidophenoxy)phenyl]sulfone, bis[3-(3-(2-(meth)acryloyloxyethyl)fumaramidophenoxy)phenyl]sulfone, bis[3-(4-(2-(meth)acryloyloxyethyl)fumaramidophenoxy)phenyl]sulfone, bis[3-(2-(2-(meth)acryloyloxyethyl)fumaramidophenoxy)phenyl]sulfone, bis[4-(2-(meth)acryloyloxyethyl)fumaramidophenyl]sulfone, bis[3-(2-(meth)acryloyloxyethyl)fumaramidophenyl]sulfone, bis[2-(2-(meth)acryloyloxyethyl)fumaramidophenyl]sulfone, bis[(4-(2-(meth)acryloyloxyethyl)fumaramido-3-methyl)phenyl]sulfone, bis[(4-(2-(meth)acryloyloxyethyl)fumaramido-3-hydroxy)phenyl]sulfone, bis[(4-(2-(meth)acryloyloxyethyl)fumaramido-3-chloro)phenyl]sulfone, bis[(4-(2-(meth)acryloyloxyethyl)fumaramido-3-methoxy)phenyl]sulfone, bis[4-(3-methyl-4-(2-(meth)acryloyloxyethyl)fumaramidophenoxy)phenyl]sulfone, bis[4-(3-hydroxy-4-(2-(meth)acryloyloxyethyl)fumaramidophenoxy)phenyl]sulfone, bis[4-(3-chloro-4-(2-(meth)acryloyloxyethyl)fumaramidophenoxy)phenyl]sulfone, bis[4-(3-methoxy-4-(2-(meth)acryloyloxyethyl)fumaramidophenoxy)phenyl]sulfone, bis[4-(3-(2-(meth)acryloyloxyethyl)trimellitamidophenoxy)phenyl]-sulfone, bis[4-(4-(2-(meth)acryloyloxyethyl)trimellitamidophenoxy)phenyl]-sulfone, bis[4-(2-(2-(meth)acryloyloxyethyl)trimellitamidophenoxy)phenyl]-sulfone, bis[3-(3-(2-(meth)acryloyloxyethyl)trimellitamidophenoxy)phenyl]-sulfone, bis[3-(4-(2-(meth)acryloyloxyethyl)trimellitamidophenoxy)phenyl]-sulfone, bis[3-(2-(2-(meth)acryloyloxyethyl)trimellitamidophenoxy)phenyl]-sulfone, bis[4-(2-(meth)acryloyloxyethyl)trimellitamidophenyl]sulfone, bis[3-(2-(meth)acryloyloxyethyl)trimellitamidophenyl]sulfone, bis[2-(2-(meth)acryloyloxyethyl)trimellitamidophenyl]sulfone, bis[(4-(2-(meth)acryloyloxyethyl)trimellitamido-3-methyl)phenyl]sulfone, bis[(4-(2-(meth)acryloyloxyethyl)trimellitamido-3-hydroxy)phenyl]sulfone, bis[(4-(2-(meth)acryloyloxyethyl)trimellitamido-3-chloro)phenyl]sulfone, bis[(4-(2-(meth)acryloyloxyethyl)trimellitamido-3-methoxy)phenyl]sulfone, bis[(4-(3-methyl-4-(2-(meth)acryloyloxyethyl)trimellitamidophenoxy)phenyl]-sulfone, bis[(4-(3-hydroxy-4-(2-(meth)acryloyloxyethyl)trimellitamidophenoxy)phenyl]-sulfone, bis[(4-(3-chloro-4-(2-(meth)acryloyloxyethyl)trimellitamidophenoxy)phenyl]-sulfone, bis[(4-(3-methoxy-4-(2-(meth)acryloyloxyethyl)trimellitamidophenoxy)phenyl]-sulfone, bis[4-(3-vinylbenzamidophenoxy)phenyl]sulfone, bis[4-(4-vinylbenzamidophenoxy)phenyl]sulfone, bis[4-(2-vinylbenzamidophenoxy)phenyl]sulfone, bis[3-(3-vinylbenzamidophenoxy)phenyl]sulfone, bis[3-(4-vinylbenzamidophenoxy)phenyl]sulfone, bis[3-(2-vinylbenzamidophenoxy)phenyl]sulfone, bis[4-vinylbenzamidophenyl]sulfone, bis[3-vinylbenzamidophenyl]sulfone, bis[2-vinylbenzamidophenyl]sulfone, bis[(4-vinylbenzamido-3- methyl)phenyl]sulfone, bis[(4-vinylbenzamido-3-hydroxy) phenyl]sulfone, bis[(4-vinylbenzamido-3-chloro)phenyl] sulfone, bis[(4-vinylbenzamido-3-methoxy)phenyl]sulfone, bis[4-(3-methyl-4-vinylbenzamidophenoxy)phenyl]sulfone, bis[4-(3-hydroxy-4-vinylbenzamidophenoxy)phenyl] sulfone, bis[4-(3-chloro-4-vinylbenzamidophenoxy)phenyl] sulfone, bis[4-(3-methoxy-4-vinylbenzamidophenoxy) phenyl]sulfone, bis[4-(3-vinylbenzylcarboxamidophenoxy) phenyl]sulfone, bis[4-(4-vinylbenzylcarboxamidophenoxy) phenyl]sulfone, bis[4-(2-vinylbenzylcarboxamidophenoxy) phenyl]sulfone, bis[3-(3-vinylbenzylcarboxamidophenoxy) phenyl]sulfone, bis[3-(4-vinylbenzylcarboxamidophenoxy) phenyl]sulfone, bis[3-(2-vinylbenzylcarboxamidophenoxy) phenyl]sulfone, bis[4-vinylbenzylcarboxamidophenyl] sulfone, bis[3-vinylbenzylcarboxamidophenyl]sulfone, bis [2-vinylbenzylcarboxamidophenyl]sulfone, bis[(4-vinylbenzylcarboxamido-3-methyl)phenyl]sulfone, bis[(4-vinylbenzylcarboxamido-3-hydroxy)phenyl]sulfone, bis[(4-vinylbenzylcarboxamido-3-chloro)phenyl]sulfone, bis[(4-vinylbenzylcarboxamido-3-methoxy)phenyl]sulfone, bis[4-(3-methyl-4-vinylbenzylcarboxamidophenoxy)phenyl] sulfone, bis[4-(3-hydroxy-4-vinylbenzylcarboxamidophenoxy)phenyl]sulfone, bis[4-(3-chloro-4-vinylbenzylcarboxamidophenoxy)phenyl]sulfone, and bis[4-(3-methoxy-4-vinylbenzylcarboxamidophenoxy) phenyl]sulfone. These crosslinkable compounds may be used alone or in combination as a mixture of two or more them, for example, at the time of preparing a polymer. Among them, bis[4-(3-methacrylamidophenoxy)phenyl] sulfone is preferred from the viewpoint that the hydrophilicity-imparting effect is particularly good.

In this specification, "(meth)acryl . . . " means "acryl . . . and/or methacryl . . . ".

The crosslinkable compound of the present invention can be synthesized, for example, by a method wherein a polymerizable acid chloride having an unsaturated double bond and an aromatic diamine compound containing a sulfonyl group are subjected to an amidation reaction.

The above-mentioned polymerizable acid chloride having an unsaturated double bond is selected for use among compounds of the formula $R_1$—Cl, wherein $R_1$ is as defined above.

The above-mentioned aromatic diamine compound containing a sulfonyl group is selected for use among compounds of the formula:

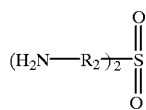

wherein $R_2$ is as defined above.

For the above amidation reaction, a tertiary amine compound such as pyridine or triethylamine may be employed as a catalyst. However, the present invention is not limited to use of such a catalyst.

Further, there is no particular restriction as to the conditions for the amidation reaction. For example, the reaction may be carried out by stirring the polymerizable acid chloride having an unsaturated double bond and the aromatic diamine compound containing a sulfonyl group in a solvent such as dichloromethane, chloroform, benzene, acetone, tetrahydrofuran, dichloroethane, diethyl ether or carbon tetrachloride in the presence of a catalyst at a temperature of from 0° C. to room temperature for from 30 minutes to 40 hours.

Further, the obtained desired product may be purified by a usual purification method such as separation by a column or recrystallization.

An optical material of the present invention can be obtained from a polymer obtained by polymerizing polymerizable components comprising the hydrophilic crosslikable compound of the formula (I) of the present invention thus obtained (hereinafter referred to as the crosslinkable compound (A)) and at least one monomer having an unsaturated double bond copolymerizable with the crosslinkable compound (A) (hereinafter referred to as the monomer (B)).

The optical material of the present invention is one obtained by using the crosslinkable compound (A) and thus has excellent hydrophilicity imparted, has the contact angle reduced and further has excellent transparency, ultraviolet absorbing property, deposit resistance and boiling resistance as well as proper hardness and oxygen permeability imparted.

Further, of course, the crosslinkable compound (A) exhibits good compatibility with various types of the monomer (B), and thus, the resulting optical material will have excellent transparency.

The amount of the crosslinkable compound (A) in the polymerizable components to obtain the above polymer, should better be adjusted to be at least 0.01 wt %, preferably at least 0.1 wt %, more preferably at least 1 wt %, in order to adequately obtain the effect of the use of such a crosslinkable compound (A), particularly the effect of imparting the hydrophilicity. Further, it should better be adjusted to be at most 30 wt %, preferably at most 20 wt %, more preferably at most 10 wt %, in order to avoid the possibility that the optical material Lends to be too hard and brittle.

The above monomer (B) can be optionally selected depending upon the nature of the desired optical material, and the amount can be properly adjusted so that the total amount of the polymerizable components will be 100 wt %. In consideration of the amount of the above crosslinkable compound (A), it is advisable to use the monomer (B) in an amount of at most 99.99 wt %, preferably at most 99.9 wt %, more preferably at most 99 wt % and at least 70 wt %, preferably at least 80 wt %, more preferably at least 90 wt %, of the polymerizable components. As such a monomer (B), to obtain a water-non-absorptive optical material, a hydrophobic monomer or macromonomer may be selected mainly for use, and to obtain a water-soluble optical material, a hydrophilic monomer or macromonomer may be selected mainly for use. Further, to obtain an optical material excellent in mechanical strength, a reinforcing monomer or macromonomer may be selected for use, and to obtain an optical material excellent in water resistance or solvent resistance, a crosslinkable monomer for forming a crosslinked structure other than the crosslinkable compound (A) may be selected for use.

Specifically, for example, in a case where it is desired to further impart oxygen permeability to the resulting optical material and at the same time to reinforce the mechanical strength of the optical material, a polysiloxane macromonomer, such as a polysiloxane macromonomer having a polymerizable group bonded to the siloxane main chain via one or two urethane bonds, a polysiloxane macromonomer having a polymerizable group bonded directly to the siloxane main chain or a polysiloxane macromonomer having a polymerizable group bonded to the siloxane main chain via an alkylene group, may be used as the monomer (B).

Such a polysiloxane macromonomer may, for example, be a macromonomer of the formula (II):

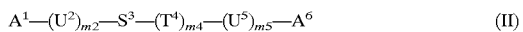

wherein $A^1$ is a group of the formula:

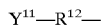

wherein $Y^{11}$ is an acryloyloxy group, a methacryloyloxy group, a vinyl group or an allyl group, and $R^{12}$ is a $C_{1-6}$ linear or branched alkylene group;

$A^6$ is a group of the formula:

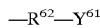

wherein $R^{62}$ is a $C_{1-6}$ linear or branched alkylene group, and $Y^{61}$ is an acryloyloxy group, a methacryloyloxy group, a vinyl group or an allyl group;

U is a group of the formula:

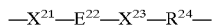

wherein $X^{21}$ is a covalent bond, an oxygen atom or a $C_{1-6}$ alkylene glycol group, $E^{22}$ is a —NHCO— group or a bivalent group wherein the terminals derived from a diisocyanate selected from a saturated aliphatic type, an alicyclic type and an aromatic type, are a —CONH— group and a —NHCO— group, $X^{23}$ is an oxygen atom, a $C_{1-6}$ alkylene glycol group or a group of the formula:

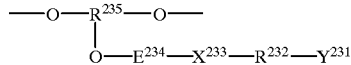

wherein $R^{235}$ is a $C_{1-6}$ trivalent hydrocarbon group, $R^{232}$ is a $C_{1-6}$ linear or branched alkylene group, $E^{234}$ is a —CONH— group or a bivalent group wherein the terminals derived from a diisocyanate selected from a saturated aliphatic type, an alicyclic type and an aromatic type, are a —CONH— group and a —NHCO— group, $X^{233}$ is a covalent bond, an oxygen atom or a $C_{1-6}$ alkylene glycol group, and $Y^{231}$ is an acryloyloxy group, a methacryloyloxy group, a vinyl group or an allyl group, provided that $X^{233}$ is a covalent bond when the adjacent $E^{234}$ is a —CONH— group, or an oxygen atom or a $C_{1-6}$ alkylene glycol group when the adjacent $E^{234}$ is a bivalent group derived from the isocyanate, and $E^{234}$ forms a urethane bond between the adjacent oxygen atom and $X^{233}$, and $R^{24}$ is a $C_{1-6}$ linear or branched alkylene group, provided that $X^{21}$ is a covalent bond when the adjacent $E^{22}$ is a —NHCO— group, or an oxygen atom or a $C_{1-6}$ alkylene glycol group when the adjacent $E^{22}$ is the bivalent group derived from the diisocyanate, and $E^{22}$ forms an urethane bond between the adjacent $E^{21}$ and $X^{23}$; $U^5$ is a group of the formula:

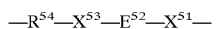

wherein $R^{54}$ is a $C_{1-6}$ linear or branched alkylene group, $X^{53}$ is an oxygen atom, a $C_{1-6}$ alkylene glycol group or a group of the formula:

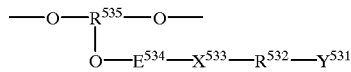

wherein $R^{535}$ is a $C_{1-6}$ trivalent hydrocarbon group, $R^{532}$ is a $C_{1-6}$ linear or branched alkylene group, $E^{534}$ is a —CONH— group or a bivalent group wherein the terminals derived from a diisocyanate selected from a saturated aliphatic type, an alicyclic type and an aromatic type, are a —CONH— group and a —NHCO— group, $X^{533}$ is a covalent bond, an oxygen atom or a $C_{1-6}$ alkylene glycol group, $Y^{531}$ is an acryloyloxy group, a methacryloyloxy group, a vinyl group or an allyl group, provided that $X^{533}$ is a covalent bond when the adjacent $E^{534}$ is a —CONH— group, or an oxygen atom or a $C_{1-6}$ alkylene glycol group when the adjacent $E^{534}$ is a bivalent group derived from the diisocyanate, and $E^{534}$ forms an urethane bond between the adjacent oxygen atom and $X^{533}$, $E^{52}$ is a —CONH— group or a bivalent group wherein the terminals derived from a diisocyanate selected from an unsaturated aliphatic type, an alicyclic type and an aromatic type, are a —CONH— group and a —NHCO— group, and $X^{51}$ is a covalent bond, an oxygen atom or a $C_{1-6}$ alkylene glycol group, provided that $X^{51}$ is a covalent bond when the adjacent $E^{52}$ is a —CONH— group, or an oxygen atom or a $C_{1-6}$ alkylene glycol group when the adjacent $E^{52}$ is a bivalent group derived from the diisocyanate, and $E^{52}$ forms a urethane bond between the adjacent $X^{51}$ and $E^{53}$;

$S^3$ is a group of the formula:

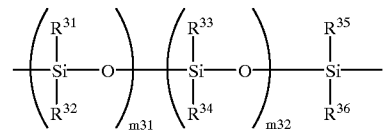

wherein each of $R^{31}$, $R^{32}$, $R^{33}$, $R^{35}$ and $R^{36}$ which are independent of one another, is a $C_{1-6}$ linear or branched alkyl group, of which some or all of hydrogen atoms may be substituted by fluorine atoms, or a phenyl group, $R^{34}$ is a $C_{1-6}$ linear or branched alkyl group, of which some or all of hydrogen atoms may be substituted by fluorine atoms, a phenyl group or a group of the formula:

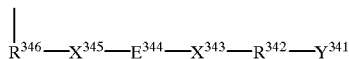

wherein each of $R^{346}$ and $R^{342}$ which are independent of each other, is a $C_{1-6}$ linear or branched alkylene group, each of $X^{345}$ and $X^{343}$ is a covalent bond, an oxygen atom or a $C_{1-6}$ alkylene glycol group, $E^{344}$ is a —CONH— group or a bivalent group wherein the terminals derived from a diisocyanate selected from a saturated aliphatic type, an alicyclic type and an aromatic type, are a —CONH— group and a —NHCO— group, and $Y^{341}$ is an acryloyloxy group, a methacryloyloxy group, a vinyl group or an allyl group, provided that each of $X^{345}$ and $X^{343}$ is a covalent bond when the adjacent $E^{344}$ is a —CONH— group, or an oxygen atom or a $C_{1-6}$ alkylene glycol group when the adjacent $E^{344}$ is a bivalent group derived from the diisocyanate, and $E^{344}$ forms an urethane bond between the adjacent $X^{345}$ and $X^{343}$, provided that a case where all of $R^{31}$, $R^{32}$, $R^{33}$, $R^{34}$, $R^{35}$ and $R^{36}$ are simultaneously $C_{1-6}$ linear or branched alkyl groups wherein some or all of hydrogen atoms are substituted by fluorine atoms, or phenyl groups, is excluded, m31 is an integer of from 1 to 100, m32 is an integer of from 0 to (100−(m31)), provided that (m31)+(m32) is an integer of from 1 to 100; and $T^4$ is a group of the formula:

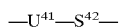

wherein $U^{41}$ is a group of the formula:

wherein each of $R^{411}$ and $R^{415}$ which are independent of each other, is a $C_{1-6}$ linear or branched alkylene group, each of $X^{412}$ and $X^{414}$ which are independent of each other, is an oxygen atom or a $C_{1-6}$ alkylene glycol group, and $E^{413}$ is a bivalent group wherein the terminals derived from a diisocyanate selected from a saturated aliphatic type, an alicyclic type and an aromatic type, are a —CONH— group and a —NHCO— group, provided that $E^{413}$ forms an urethane bond between the adjacent $X^{412}$ and $X^{414}$, and $S^{42}$ is a group of the formula:

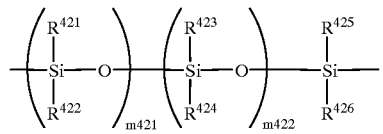

wherein each of $R^{421}$, $R^{422}$, $R^{423}$, $R^{425}$ and $R^{426}$ which are independent of one another, is a $C_{1-6}$ linear or branched alkyl group wherein some or all of hydrogen atoms may be substituted by fluorine atoms, or a phenyl group, $R^{424}$ is a $C_{1-6}$ linear or branched alkyl group wherein some or all of hydrogen atoms may be substituted by fluorine atoms, a phenyl group or a group of the formula:

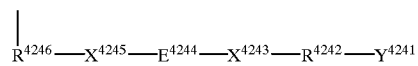

wherein each of $R^{4246}$ and $R^{4242}$ which are independent of each other, is a $C_{1-6}$ linear or branched alkylene group, each of $X^{4245}$ and $X^{4243}$ is a covalent bond, an oxygen atom or a $C_{1-6}$ alkylene glycol group, $E^{4244}$ is a —CONH— group or a bivalent group wherein the terminals derived from a diisocyanate selected from a saturated aliphatic type, an alicyclic type and an aromatic type, are a —CONH— group and a —NHCO— group, and $Y^{4241}$ is an acryloyloxy group, a methacryloyloxy group, a vinyl group or an allyl group, provided that each of $X^{4245}$ and $X^{4243}$ is a covalent bond when the adjacent $E^{4244}$ is a —CONH— group, or an oxygen atom or a $C_{1-6}$ alkylene glycol group when the adjacent $E^{4244}$ is a bivalent group derived from the diisocyanate, and $E^{4244}$ forms an urethane bond between the adjacent $X^{4245}$ and $X^{4243}$, provided that a case wherein all of $R^{421}$, $R^{422}$, $R^{423}$, $R^{424}$, $R^{425}$ and $R^{426}$ are simultaneously $C_{1-6}$ linear or branched alkyl groups wherein some or all of hydrogen atoms are substituted by fluorine atoms, or phenyl groups, is excluded, m421 is an integer of from 1 to 100, and m422 is an integer of from 0 to (100−(m421), provided that (m421)+(m422) is an integer of from 1 to 100, or a group of the formula:

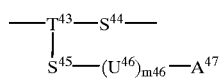

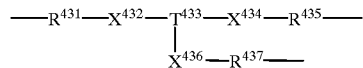

wherein each of $R^{431}$, $R^{435}$ and $R^{437}$ which are independent of one another, is a $C_{1-6}$ linear or branched alkylene group, each of $X^{432}$, $X^{434}$ and $X^{436}$ which are independent of one another, is an oxygen atom or a $C_{1-6}$ alkylene glycol group, and $T^{433}$ is a group of the formula:

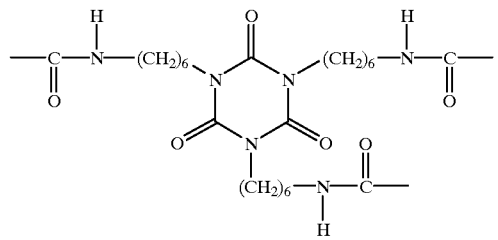

provided that it forms a urethane bond among the adjacent $X^{432}$, $X^{434}$ and $X^{436}$, $S^{44}$ is a group of the formula:

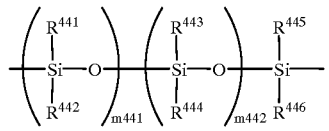

wherein each of $R^{441}$, $R^{442}$, $R^{445}$ and $R^{446}$ which are independent of one another is a $C_{1-6}$ linear or branched alkyl group wherein some or all of hydrogen atoms may be substituted by fluorine atoms, or a phenyl group, $R^{444}$ is a $C_{1-6}$ linear or branched alkyl group wherein some or all of hydrogen atoms may be substituted by fluorine atoms, a phenyl group or a group of the formula:

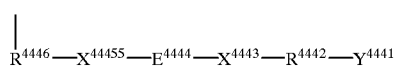

wherein each of $R^{4446}$ and $R^{4442}$ which are independent of each other, is a $C_{1-6}$ linear or branched alkylene group, each of $X^{4445}$ and $X^{4443}$ is a covalent bond, an oxygen atom or a $C_{1-6}$ alkylene glycol group, $E^{4444}$ is a —CONH— group or a bivalent group wherein the terminals derived from a diisocyanate selected from a saturated aliphatic type, an alicyclic type and an aromatic type, are a —CONH— group and a —NHCO— group, and $Y^{4441}$ is an acryloyloxy group, a methacryloyloxy group, a vinyl group or an allyl group, provided that each of $X^{4445}$ and $X^{4443}$ is a covalent bond when the adjacent $E^{4444}$ is a —CONH— group, or an oxygen atom or a $C_{1-6}$ alkylene glycol group when the adjacent $E^{4444}$ is a bivalent group derived from the isocyanate, and $E^{4444}$ forms a urethane bond between the adjacent $X^{4445}$ and $X^{4443}$, provided that a case wherein all of $R^{441}$, $R^{442}$, $R^{443}$, $R^{444}$, $R^{445}$ and $R^{446}$ are simultaneously $C_{1-6}$ linear or branched alkyl groups wherein some or all of hydrogen atoms are substituted by fluorine atoms, or phenyl groups, is excluded, m441 is an integer of from 1 to 100, and m442 is an integer of from 0 to (100−(m441), provided that (m441)+(m442) is an integer of from 1 to 100, $S^{45}$ is a group of the formula:

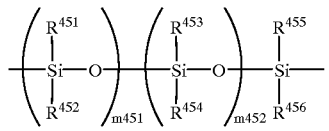

wherein each of $R^{451}$, $R^{452}$, $R^{453}$, $R^{455}$ and $R^{456}$ which are independent of one another, is a $C_{1-6}$ linear or branched alkyl group wherein some or all of hydrogen atoms may be substituted by fluorine atoms, or a phenyl group, $R^{454}$ is a $C_{1-6}$ linear branched alkyl group wherein some or all of hydrogen atoms may be substituted by fluorine atoms, a phenyl group or a group of the formula:

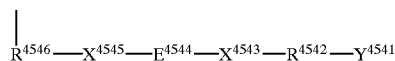

wherein each of $R^{4546}$ and $R^{4542}$ which are independent of each other, is a $C_{1-6}$ linear branched alkylene group, each of $X^{4545}$ and $X^{4543}$ is a covalent bond, an oxygen atom or a $C_{1-6}$ alkylene glycol group, $E^{4544}$ is a —CONH— group or a bivalent group wherein the terminals derived from a diisocyanate selected from a saturated aliphatic type, an alicyclic type and an aromatic type, are a —CONH— group and a —NHCO— group, $Y^{4541}$ is an acryloyloxy group, a methacryloyloxy group, a vinyl group or an allyl group, provided that each of $X^{4545}$ and $X^{4543}$ is a covalent bond when the adjacent $E^{4544}$ is a —CONH— group, or an oxygen atom or a $C_{1-6}$ alkylene glycol group when the adjacent $E^{4544}$ is a bivalent group derived from the diisocyanate, and $E^{4544}$ forms a urethane bond between the adjacent $X^{4545}$ and $X^{4543}$, provided that a case wherein all of $R^{451}$, $R^{452}$, $R^{453}$, $R^{454}$, $R^{455}$ and $R^{456}$ are simultaneously $C_{1-6}$ linear or branched alkyl groups wherein some or all of hydrogen atoms are substituted by fluorine atoms, or phenyl groups, is excluded, m451 is an integer of from 1 to 100, and m452 is an integer of from 0 to (100−(m451)), provided that (m451)+(m452) is an integer of from 1 to 100, $U^{46}$ is a group of the formula:

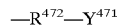

wherein $R^{461}$ is a $C_{1-6}$ linear or branched alkylene group, $X^{462}$ is an oxygen atom, a $C_{1-6}$ alkylene glycol group or a group of the formula:

—O—$R^{4625}$—O—

O—$E^{4624}$—$X^{4623}$—$R^{4622}$—$Y^{4621}$ wherein $R^{4625}$ is a $C_{1-6}$ trivalent hydrocarbon group, $R^{4622}$ is a $C_{1-6}$ linear or branched alkylene group, $E^{4624}$ is a —CONH— group or a bivalent group wherein the terminals derived from a diisocyanate selected from a saturated aliphatic type, an alicyclic type and an aromatic type, are a —CONH— group and a —NHCO— group, $X^{4623}$ is a covalent bond, an oxygen atom or a $C_{1-6}$ alkylene glycol group, and $Y^{4621}$ is an acryloyloxy group, a methacryloyloxy group, a vinyl group or an allyl group, provided that $X^{4623}$ is a covalent bond when the adjacent $E^{4624}$ is a —CONH— group, or an oxygen atom or a $C_{1-6}$ alkylene glycol group when the adjacent $E^{4624}$ is a bivalent group derived from the isocyanate, and $E^{4624}$ forms a urethane bond between the adjacent oxygen atom and $X^{4623}$, $E^{463}$ is a —CONH— group or a bivalent group wherein the terminals derived from a diisocyanate selected from a saturated aliphatic type, an alicyclic type and an aromatic type, are a —CONH— group and a —NHCO— group, $X^{464}$ is a covalent bond, an oxygen atom or a $C_{1-6}$ alkylene glycol group, provided that $X^{464}$ is a covalent bond when the adjacent $E^{463}$ is a —CONH— group, or an oxygen atom or a $C_{1-6}$ alkylene glycol group when the adjacent $E^{463}$ is a bivalent group derived from the diisocyanate, and $E^{463}$ forms a urethane bond between the adjacent $X^{462}$ and $X^{464}$, and $A^{47}$ is a group of the formula:

—$R^{472}$—$Y^{471}$ wherein $R^{472}$ is a $C_{1-6}$ linear or branched alkylene group, and $Y^{471}$ is an acryloyloxy group, a methacryloyloxy group, a vinyl group or an allyl group, and m46 is 0 or 1, m2 is 0 or 1, m4 is 0, 1, 2 or 3, and m5 is 0 or 1, provided that m2, m5 and m46 are all the same; such as an urethane bond-containing polysiloxane macromonomer (hereinafter referred to as macromonomer a) of the formula:

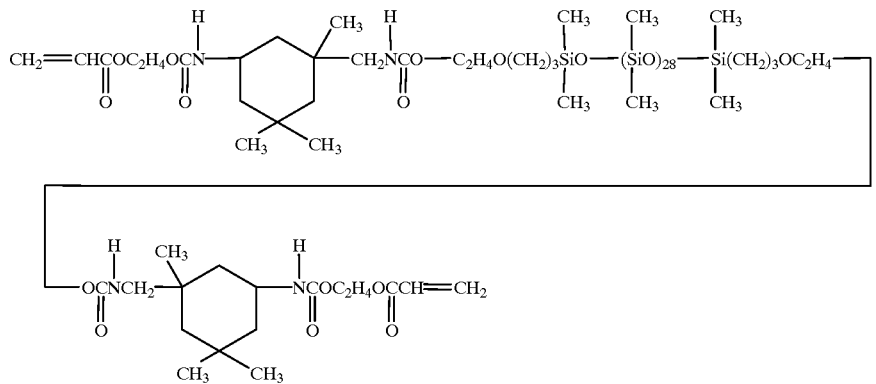

Such polysiloxane macromonomers may be used alone or in combination as a mixture of two or more of them. The amount of such a polysiloxane macromonomer may be suitably adjusted depending upon the nature of the desired optical material.

For example, when it is desired to improve the oxygen permeability of the resulting optical material, a silicon-containing monomer, such as a silicon-containing alkyl (meth)acrylate, a silicon-containing styrene derivative or an alkylvinyl silane, may be employed as the monomer (B).

The silicon-containing alkyl (meth)acrylate may, for example, be an organopolysiloxane-containing alkyl (meth) acrylate, such as pentamethyldisiloxanylmethyl (meth) acrylate, trimethylsiloxydimethylsilylpropyl (meth)acrylate, methylbis(trimethylsiloxy)silylpropyl (meth)acrylate, tris (trimethylsiloxy)silylpropyl (meth)acrylate, mono [methylbis(trimethylsiloxy)siloxy]bis(trimethyl siloxy) silylpropyl (meth)acrylate, tris[methylbis(trimethylsiloxy) siloxy]silylpropyl (meth)acrylate, methyl[bis (trimethylsiloxy)]silylpropylglyceryl (meth)acrylate, tris (trimethylsiloxy)silylpropylglyceryl (meth)acrylate, mono [methylbis(trimethylsiloxy)siloxy]bis(trimethyl siloxy) silylpropylglyceryl (meth)acrylate, trimethylsilylethyltetramethyldisiloxanylpropylglyceryl (meth)acrylate, trimethylsilylmethyl (meth)acrylate, trimethylsilylpropyl (meth)acrylate, trimethylsilylpropylglyceryl (meth)acrylate, pentamethyldisiloxanylpropylglyceryl (meth)acrylate, methylbis(trimethylsiloxy) silylethyltetramethyl disiloxanylmethyl (meth)acrylate, tetramethyltriisopropylcyclotetrasiloxanylpropyl (meth) acrylate, tetramethyltriisopropylcyclotetrasiloxybis (trimethyl siloxy)silylpropyl (meth)acrylate or trimethylsiloxydimethylsilylpropyl (meth)acrylate.

The above silicon-containing styrene derivative may, for example, be a silicon-containing styrene derivative of the formula (III):

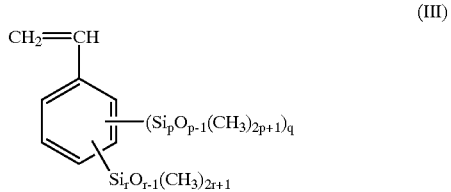

wherein p is an integer of from 1 to 15, q is 0 or 1, and r is an integer of from 1 to 15. In the silicon-containing styrene derivative of the formula (III), if p or r is an integer of 16 or higher, the synthesis or purification tends to be difficult, and the hardness of the resulting optical material tends to be low. Further, if q is an integer of 2 or higher, the synthesis of such a silicon-containing styrene derivative tends to be difficult.

Typical examples of the silicon-containing styrene derivative of the above formula (III) include tris(trimethylsiloxy) silyl styrene, bis(trimethylsiloxy)methylsilyl styrene, dimethylsilyl styrene, trimethylsilyl styrene, tris (trimethylsiloxy)siloxanyldimethylsilyl styrene, [bis (trimethylsiloxy)methylsiloxanyl]dimethylsilyl styrene, pentamethyldisiloxanyl styrene, heptamethyltrisiloxanyl styrene, nonamethyltetrasiloxanyl styrene, pentadecamethylheptasiloxanyl styrene, heneicosamethyldecasiloxanyl styrene, heptacosamethyltridecasiloxanyl styrene, hentriacontamethylpentadecasiloxanyl styrene, trimethylsiloxypentamethyldisiloxymethylsilyl styrene, tris (pentamethyldisiloxy)silyl styrene, (tristrimethylsiloxy) siloxanylbis(trimethylsiloxy)silyl styrene, bis (heptamethyltrisiloxy)methylsilyl styrene, tris (methylbistrimethylsiloxysiloxy)silyl styrene, trimethylsiloxybis(tristrimethylsiloxysiloxy)silyl styrene, heptakis(trimethylsiloxy)trisiloxanyl styrene, tris (tristrimethylsiloxysiloxy)silyl styrene, (tristrimethylsiloxyhexamethyl)tetrasiloxy(tristrimethyl siloxy)siloxytrimethylsiloxysilyl styrene, nonakis (trimethylsiloxy)tetrasiloxanyl styrene, bis (tridecamethylhexasiloxy)methylsilyl styrene, heptamethylcyclotetrasiloxanyl styrene, heptamethylcyclotetrasiloxybis (trimethylsiloxy)silyl styrene, and tripropyltetramethylcyclotetrasiloxanyl styrene.

The above alkylvinyl silane may, for example, be trimethylvinyl silane.

Among the above silicon-containing monomers, tris (trimethylsiloxy)silylpropyl (meth)acrylate and tris (trimethylsiloxy)silyl styrene are particularly preferred, since they are excellent in the compatibility with other polymerizable components, and they have large effects for improving the oxygen permeability of the resulting optical material.

Such silicon-containing monomers may be used alone or in combination as a mixture of two or more of them. The amount of such a silicon-containing monomer may suitably be adjusted depending upon the nature of the desired optical material.

When it is desired to further improve the hydrophilic property of the resulting optical material and to impart water absorptivity to the optical material, a hydrophilic monomer having a hydroxyl group, an amide group, a carboxyl group, an amino group, a glycol residue or a pyrrolidone structure other than the crosslinkable monomer (A) may, for example, be used as the monomer (B).

The above hydrophilic monomer may, for example, be a hydroxyalkyl (meth)acrylate such as 2-hydroxyethyl (meth) acrylate, hydroxybutyl (meth)acrylate or hydroxypropyl (meth)acrylate; an (alkyl)aminoalkyl (meth)acrylate such as 2-dimethylaminoethyl (meth)acrylate or 2-butylaminoethyl (meth)acrylate; an alkyl (meth)acrylamide such as N,N-dimethyl (meth)acrylamide; a polyglycol mono(meth) acrylate such as propylene glycol mono(meth)acrylate; vinyl pyrrolidone; (meth)acrylic acid; maleic anhydride, fumaric acid; a fumaric acid derivative; amino styrene; or hydroxy styrene.

Among the above hydrophilic monomers, an alkyl (meth) acrylamide, (meth)acrylic acid and a hydroxyalkyl (meth) acrylate are particularly preferred, since they are excellent in the compatibility with other polymerizable components, and they have large effects for improving the hydrophilic property of the resulting optical material.

The above hydrophilic monomers may be used alone or in combination as a mixture of two or more of them. The amount of such a hydrophilic monomer may suitably be adjusted depending upon the nature of the desired optical material.

Further, when it is desired to improve the mechanical strength or durability of the resulting optical material and to impart water resistance and solvent resistance to the optical material, it is preferred to employ a crosslinkable monomer other than the crosslinkable monomer (A), which is a polyfunctional polymerizable compound having at least two copolymerizable unsaturated double bonds, as the monomer (B).

Such a crosslinkable monomer may, for example, be ethylene glycol di(meth)acrylate, diethylene glycol di(meth) acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, methacryloyloxyethyl acrylate, divinylbenzene, diallyl phthalate, diallyl adipate, triallyl isocyanurate, α-methylene-N-vinylpyrrolidone, 4-vinylbenzyl (meth)acrylate, 3-vinylbenzyl (meth)acrylate, 2,2-bis(p-(meth)acryloyloxyphenyl)hexafluoropropane, 2,2-bis(m-(meth)acryloyloxyphenyl)hexafluoropropane, 2,2-bis (o-(meth)acryloyloxyphenyl)hexafluoropropane, 2,2-bis(p-(meth)acryloyloxyphenyl)propane, 2,2-bis(m-(meth)

acryloyloxyphenyl)propane, 2,2-bis(o-(meth) acryloyloxyphenyl)propane, 1,4-bis(2-(meth) acryloyloxyhexafluoroisopropyl)benzene, 1,3-bis(2-(meth) acryloyloxyhexafluoroisopropyl)benzene, 1,2-bis(2-(meth) acryloyloxyhexafluoroisopropyl)benzene, 1,4-bis(2-(meth) acryloyloxyisopropyl)benzene, 1,3-bis(2-(meth) acryloyloxyisopropyl)benzene, or 1,2-bis(2-(meth) acryloyloxyisopropyl)benzene.

Among the above crosslinkable monomers, ethylene glycol di(meth)acrylate and 4-vinylbenzyl(meth)acrylate are particularly preferred, since they are excellent in the compatibility with other polymerizable components, and they have large effects for improving the mechanical strength of the resulting optical material.

The above crosslinkable monomers may be used alone or in combination as a mixture of two or more of them. The amount of such a crosslinkable monomer may be suitably adjusted depending upon the nature of the desired ocular lens material. For example, when it is desired to obtain adequate effects for improving the mechanical strength, it is advisable to adjust the amount of the crosslinkable monomer to a level of at least 0.01 wt % of the total amount of the polymerizable components. Further, in order to avoid possible brittleness of the resulting optical material, it is advisable to adjust the amount to a level of at most 10 wt % of the total amount of the polymerizable components.

Further, when it is desired to improve deposit resistance to the resulting optical material, it is preferred to employ a fluorine-containing monomer which is a polymerizable compound having some of hydrogen atoms of a hydrocarbon group substituted by fluorine atoms, as the monomer (B).

Such a fluorine-containing monomer may, for example, be a monomer of the formula (IV):

$$CH_2=CR^1COOC_sH_{(2s-t-u+1)}F_t(OH)_u \qquad (IV)$$

wherein $R^1$ is a hydrogen atom or a methyl group, s is an integer of from 1 to 15, t is a integer of from 1 to (2s+1), and u is an integer of from 0 to 2.

Typical examples of the monomer of the above formula (IV) include 2,2,2-trifluoroethyl (meth)acrylate, 2,2,3,3-tetrafluoropropyl (meth)acrylate, 2,2,3,3-tetrafluoro-t-pentyl (meth)acrylate, 2,2,3,4,4,4-hexafluorobutyl (meth)acrylate, 2,2,3,4,4,4-hexafluoro-t-hexyl (meth)acrylate, 2,3,4,5,5,5-hexafluoro-2,4-bis(trifluoromethyl)pentyl (meth)acrylate, 2,2,3,3,4,4-hexafluorobutyl (meth)acrylate, 2,2,2,2', 2',2'-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,5-nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8,8,9,9,10,10,11,11,11-nonadecafluoroundecyl (meth)acrylate, 3,3,4,4,5,5,6,6,7,7,8,8,9,9,10,10,11,11,12,12-eicosafluorododecyl (meth)acrylate, 2-hydroxy-4,4,5,5,6,7,7,7-octafluoro-6-trifluoromethylheptyl (meth)acrylate, 2-hydroxy-4,4,5,6,6,7,7,8,9,9,9-dodecafluoro-8-trifluoromethylnonyl (meth)acrylate and 2-hydroxy-4,4,5,5,6,6,7,7,8,8,9,9,10,11,11,11-hexadecafluoro-10-trifluoromethylundecyl (meth)acrylate.

Among the above fluorine-containing monomers, 2,2,2-trifluoroethyl (meth)acrylate and 2,2,2,2',2',2'-hexafluoroisopropyl (meth)acrylate are particularly preferred, since they have large effects for improving the deposit resistance of the resulting optical material.

The above fluorine-containing monomers may be used alone or in combination as a mixture of two or more of them. The amount of such a fluorine-containing monomer may suitably be adjusted depending upon the nature of the desired ocular lens material.

Further, to impart hardness or softness by adjusting the hardness of the resulting optical material, a hardness-adjusting monomer such as an alkyl (meth)acrylate or an alkyl styrene which is a polymerizable compound having an alkyl group, or styrene, may, for example, be used as the monomer (B).

The above alkyl (meth)acrylate may, for example, be a linear, branched or cyclic alkyl (meth)acrylate, such as methyl (meth)acrylate, ethyl (meth)acrylate, isopropyl (meth)acrylate, n-propyl (meth)acrylate, isobutyl (meth) acrylate, n-butyl (meth)acrylate, 2-ethylhexyl (meth) acrylate, n-octyl (meth)acrylate, n-decyl (meth)acrylate, n-dodecyl (meth)acrylate, t-butyl (meth)acrylate, pentyl (meth)acrylate, t-pentyl (meth)acrylate, hexyl (meth) acrylate, heptyl (meth)acrylate, nonyl (meth)acrylate, stearyl (meth)acrylate, cyclopentyl (meth)acrylate or cyclohexyl (meth)acrylate; an alkoxyalkyl (meth)acrylate such as 2-ethoxyethyl (meth)acrylate, 3-ethoxypropyl (meth) acrylate, 2-methoxyethyl (meth)acrylate or 3-methoxypropyl (meth)acrylate; or an alkylthioalkyl (meth)acrylate such as ethylthioethyl (meth)acrylate or methythioethyl (meth)acrylate.

The above alkyl styrene may, for example, be α-methyl styrene; an alkyl styrene such as methyl styrene, ethyl styrene, propyl styrene, butyl styrene, t-butyl styrene, isobutyl styrene or pentyl styrene; or an alkyl α-methyl styrene such as methyl-α-methyl styrene, ethyl-α-methyl styrene, propyl-α-methyl styrene, butyl-α-methyl styrene, t-butyl-α-methyl styrene, isobutyl-α-methyl styrene or pentyl-α-methyl styrene.

When it is desired to obtain, for example, a soft optical material such as a soft contact lens, it is preferred to employ, among such hardness-adjusting monomers, the one which, when formed into a homopolymer, will have a glass transition temperature (hereinafter referred to as Tg) of at most 40° C. Further, when it is desired to obtain a hard optical material such as a hard contact lens, it is preferred to employ the one which, when formed into a homopolymer, will have a Tg of higher than 40° C. Among them, styrene, an alkyl (meth)acrylate and an alkyl styrene are particularly preferred, since they are excellent in compatibility or copolymerizability with other polymerizable components.

The above hardness-adjusting monomers may be used alone or in combination as a mixture of two or more of them. The amount of such a hardness-adjusting monomer may suitably be adjusted depending upon the nature of the desired optical material.

Further, to improve ultraviolet absorptivity to the resulting optical material or to color the optical material, a polymerizable ultraviolet absorber, a polymerizable dyestuff or a polymerizable ultraviolet absorbing dyestuff may, for example, be used as the monomer (B).

Specific examples of the polymerizable ultraviolet absorber include benzophenone type polymerizable ultraviolet absorbers such as 2-hydroxy-4-(meth) acryloyloxybenzophenone, 2-hydroxy-4-(meth) acryloyloxy-5-tert-butylbenzophenone, 2-hydroxy-4-(meth) acryloyloxy-2',4'-dichlorobenzophenone and 2-hydroxy-4-(2'-hydroxy-3'-(meth)acryloyloxypropoxy)benzophenone;

benzotriazole type polymerizable ultraviolet absorbers such as 2-(2'-hydroxy-5-(meth)acryloyloxyethylphenyl)-2H-benzotriazole, 2-(2'-hydroxy-5'-(meth)acryloyloxyethylphenyl)-5-chloro-2H-benzotriazole, 2-(2'-hydroxy-5'-(meth)acryloyloxypropylphenyl)-2H-benzotriazole and 2-(2'-hydroxy-5'-(meth)acryloyloxypropyl-3'-tert-butylphenyl)-5-chloro-2H-benzotriazole; salicylic acid derivative-type polymerizable ultraviolet absorbers such as phenyl 2-hydroxy-4-(meth)acryloyloxymethylbenzoate; and other polymerizable ultraviolet absorbers such as methyl 2-cyano-3-phenyl-3-(3'-(meth)acryloyloxyphenyl)propenoate. These polymerizable ultraviolet absorbers may be used alone or in combination as a mixture of two or more of them.

Specific examples of the polymerizable dyestuff include azo type polymerizable dyestuffs such as 1-phenylazo-4-(meth)acryloyloxynaphthalene, 1-phenylazo- 2-hydroxy-3-(meth)acryloyloxynaphthalene, 1-naphthylazo-2-hydroxy-3-(meth)acryloyloxynaphthalene, 1-(α-anthrylazo)-2-hydroxy-3-(meth)acryloyloxynaphthalene, 1-((4'-(phenylazo)phenyl)azo)-2-hydroxy-3-(meth)acryloyloxynaphthalene, 1-(2',4'-xylylazo)-2-(meth)acryloyloxynaphthalene, 1-(o-tolylazo)-2-(meth)acryloyloxynaphthalene, 2-(m-(meth)acryloylamide-anilino)-4,6-bis(1'-(o-tolylazo)-2'-naphthylamino)-1,3,5-triazine, 2-(m-vinylanilino)-4-((4'-nitrophenylazo)-anilino)-6-chloro-1,3,5-triazine, 2-(1'-(o-tolylazo)-2'-naphthyloxy-4-(m-vinylanilino)-6-chloro-1,3,5-triazine, 2-(p-vinylanilino)-4-(1'-(o-tolylazo)-2'-naphthylamino)-6-chloro-1,3,5-triazine, N-(1-(o-tolylazo)-2'-naphthyl)-3-vinylphthalic acid monoamide, N-(1'-(o-tolylazo)-2'-naphthyl)-6-vinylphthalic acid monoamide, 3-vinylphthalic acid-(4(p-sulfophenylazo)-1'-naphthyl)monoester, 6-vinylphthalic acid-(4'-(p-sulfophenylazo)-1'-naphthyl)monoester, 3-(meth)acryloylamide-4-phenylazophenol, 3-(meth)acryloylamide-4-(8'-hydroxy-3',6'-disulfo-1-naphthylazo) phenol, 3-(meth)acryloylamide-4-(1-phenylazo-2'-naphthylazo)phenol, 3-(meth)acryloylamide-4-(p-tolylazo) phenol, 2-amino-4-(m-(2'-hydroxy-1'-naphthylazo)anilino)-6-isopropenyl-1,3,5-triazine, 2-amino-4-(N-methyl-p-(2'-hydroxy-1'-naphthylazo)anilino)-6-isopropenyl-1,3,5-triazine, 2-amino-4-(m-(4'-hydroxy-1-phenylazo)anilino)-6-isopropenyl-1,3,5-triazine, 2-amino-4-(N-methyl-p-(4-hydroxyphenylazo)anilino)-6-isopropenyl-1,3,5-triazine, 2-amino-4-(m-(3'-methyl-1'-phenyl-5'-hydroxy-4'-pyrazolylazo)anilino)-6-isopropenyl-1,3,5-triazine, 2-amino-4-(N-methyl-p-(3'-methyl-1'-phenyl-5'-hydroxy-4'-pyrazolylazo)anilino)-6-isopropenyl-1,3,5-triazine, 2-amino-4-(p-phenylazoanilino)-6-isopropenyl-1,3,5-triazine and 4-phenylazo-7-(meth)acryloylamide-1-naphthol; anthraquinone type polymerizable dyestuffs such as 1,5-bis((meth)acryloylamino)-9,10-anthraquinone, 1-(4'-vinylbenzoylamide)-9,10-anthraquinone, 4-amino-1-(4'-vinylbenzoylamide)-9,10-anthraquinone, 5-amino-1-(4'-vinylbenzoylamide)-9,10-anthraquinone, 5-amino-1-(4'-vinylbenzoylamide)-9,10-anthraquinone, 4-nitro-1-(4'-vinylbenzoylamide)-9,10-anthraquinone, 4-hydroxy-1-(4'-vinylbenzoylamide)-9,10-anthraquinone, 1-(3'-vinylbenzoylamide)-9,10-anthraquinone, 1-(2'-vinylbenzoylamide)-9,10-anthraquinone, 1-(4'-isopropenylbenzoylamide)-9,10-anthraquinone, 1-(3'-isopropenylbenzoylamide)-9,10-anthraquinone, 1-(2'-isopropenylbenzoylamide)-9,10-anthraquinone, 1,4-bis-(4'-vinylbenzoylamide)-9,10-anthraquinone, 1,4-bis-(4'-isopropenylbenzoylamide)-9,10-anthraquinone, 1,5-bis-(4'-vinylbenzoylamide)-9,10-anthraquinone, 1,5-bis- (4'-isopropenylbenzoylamide)-9,10-anthraquinone, 1-methylamino-4-(3'-vinylbenzoylamide)-9,10-anthraquinone, 1-methylamino-4-(4'-vinylbenzoyloxyethylamino)-9,10-anthraquinone, 1-amino-4-(3-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9,10-anthraquinone-2-sulfonic acid, 1-amino-4-(3'-(meth)acryloylaminophenylamino)-9,10-anthraquinone-2-sulfonic acid, 1-amino-4-(3'-(meth)acryloylaminobenzylamino)-9,10-anthraquinone-2-sulfonic acid, 1-(β-ethoxycarbonylallylamino)-9,10-anthraquinone, 1-(β-carboxyallylamino)-9,10-anthraquinone, 1,5-di-(β-carboxyallylamino)-9,10-anthraquinone, 1-(β-isopropoxycarbonylallylamino)-5-benzoylamide-9,10-anthraquinone, 2-(3'-(meth)acryloylamide-anilino)-4-(3'-(3"-sulfo-4"-aminoanthraquinon-1"-yl)amino-anilino)-6-chloro-1,3,5-triazine, 2-(3'-(meth)acryloylamide-anilino)-4-(3'-(3"-sulfo-4"-aminoanthraquinon-1"-yl)amino-anilino)-6-hydrazino-1,3,5-triazine, 2,4-bis-((4"-methoxyanthraquinon-1-yl)amino)-6-(3'-vinylanilino)-1,3,5-triazine and 2-(2'-vinylphenoxy)-4-(4'-(3"-sulfo-4"-aminoanthraquinon-1"-yl-amino)anilino)-6-chloro-1,3,5-triazine; nitro type polymerizable dyestuffs such as o-nitroanilinomethyl (meth)acrylate; and phthalocyanine type polymerizable dyestuffs such as (meth)acryloyl-modified tetraamino copper phthalocyanine and (meth)acryloyl-modified (dodecanoyl-modified tetraamino copper phthalocyanine). These polymerizable dyestuffs may be used alone or in combination as a mixture of two or more of them.

Specific examples of the polymerizable ultraviolet absorbing dyestuff include benzophenone type polymerizable ultraviolet absorbing dyestuffs such as 2,4-dihydroxy-3-(p-styrenoazo)benzophenone, 2,4-dihydroxy-5-(p-styrenoazo)benzophenone, 2,4-dihydroxy-3-(p-(meth)acryloyloxymethylphenylazo)benzophenone, 2,4-dihydroxy-5-(p-(meth)acryloyloxymethylphenylazo) benzophenone, 2,4-dihydroxy-3-(p-(meth)acryloyloxyethylphenylazo)benzophenone, 2,4-dihydroxy-5-(p-(meth)acryloyloxyethylphenylazo)benzophenone, 2,4-dihydroxy-3-(p-(meth)acryloyloxypropylphenylazo) benzophenone, 2,4-dihydroxy-5-(p-(meth)acryloyloxypropylphenylazo)benzophenone, 2,4-dihydroxy-3-(o-(meth)acryloyloxymethylphenylazo) benzophenone, 2,4-dihydroxy-5-(o-(meth)acryloyloxymethylphenylazo)benzophenone, 2,4-dihydroxy-3-(o-(meth)acryloyloxyethylphenylazo) benzophenone, 2,4-dihydroxy-5-(o-(meth)acryloyloxyethylphenylazo)benzophenone, 2,4-dihydroxy-3-(o-(meth)acryloyloxypropylphenylazo)benzophenone, 2,4-dihydroxy-5-(o-(meth)acryloyloxypropylphenylazo) benzophenone, 2,4-dihydroxy-3-(p-(N,N-di(meth) acryloyloxyethylamino)phenylazo)benzophenone, 2,4-dihydroxy-5-(p-(N,N-di(meth)acryloyloxyethylamino) phenylazo)benzophenone, 2,4-dihydroxy-3-(o-(N,N-di (meth)acryloyloxyethylamino)phenylazo)benzophenone, 2,4-dihydroxy-5-(o-(N,N-di(meth)acryloylethylamino) phenylazo)benzophenone, 2,4-dihydroxy-3-(p-(N-ethyl-N-(meth)acryloyloxyethylamino)phenylazo)benzophenone, 2,4-dihydroxy-5-(p-(N-ethyl-N-(meth) acryloyloxyethylamino)phenylazo)benzophenone, 2,4-dihydroxy-3-(o-(N-ethyl-N-(meth)acryloyloxyethylamino) phenylazo)benzophenone, 2,4-dihydroxy-5-(o-(N-ethyl-N-(meth)acryloyloxyethylamino)phenylazo)benzophenone, 2,4-dihydroxy-3-(p-(N-ethyl-N-(meth)acryloylamino) phenylazo)benzophenone, 2,4-dihydroxy-5-(p-(N-ethyl-N-(meth)acryloylamino)phenylazo)benzophenone, 2,4- dihydroxy-3-(o-(N-ethyl-N-(meth)acryloylamino) phenylazo)benzophenone and 2,4-dihydroxy-5-(o-(N-ethyl-N-(meth)acryloylamino)phenylazo)benzophenone; and benzoic acid type polymerizable ultraviolet absorbing dyestuffs such as phenyl 2-hydroxy-4-(p-styrenoazo)benzoate. These polymerizable ultraviolet absorbing dyestuffs may be used alone or in combination as a mixture of two or more of them.

The amount of the above polymerizable ultraviolet absorber, polymerizable dyestuff and polymerizable ultraviolet absorbing dyestuff, may suitably be adjusted depending upon the nature of the desired ocular lens material. However, it is advisable to take it into account that the amount is substantially influenced by the thickness of the lens. Their amount is preferably at most 3 wt %, more preferably from 0.1 to 2 wt %, of the total amount of the polymerizable components, to avoid deterioration of the physical properties of the optical material, such as mechanical strength. Further, in consideration of the toxicity of the ultraviolet absorber or dyestuff, an excessive amount tends to be unsuitable as a material for ocular lenses such as contact lenses which are in direct contact with living tissues or intraocular lenses embedded in living bodies. Further, particularly in the case of a dyestuff, if the amount is too much, the color of the lens tends to be so deep that the transparency decreases, and visible light tends to be hardly transmitted through the lens, and it is advisable to adjust the amount as the case requires.

In the present invention, among the above monomers (B), one or more monomers other than polysiloxane macromonomers, may be selected and formed into a macromonomer, which is then incorporated, as one of the monomers (B), to the polymerizable components.

The polymerizable components comprising the above-mentioned crosslinkable compound (A) and the monomer (B), are suitably adjusted and subjected to polymerization depending upon the use of the desired optical material, e.g. an ocular lens such as a contact lens or an intraocular lens.

In the present invention, the polymerization can be carried out by a conventional method by adjusting the amounts of the polymerizable components comprising the crosslinkable compound (A) and the monomer (B) within the ranges of the above-mentioned respective amounts and adding a radical polymerization initiator thereto, to obtain a polymer.

The conventional method is, for example, a method wherein a radical polymerization initiator is added, followed by gradual heating within a temperature range of from room temperature to about 130° C. or by irradiation of an electromagnetic wave such as a microwave, ultraviolet rays or a radiation (such as γ-rays). In the case of heat polymerization, the temperature may be raised stepwise. The polymerization may be carried out by a bulk polymerization method or a solution polymerization method employing e.g. a solvent, or by other methods.

Typical examples of the above-mentioned radical polymerization initiator include azobisisobutyronitrile, azobisdimethylvaleronitrile, benzoyl peroxide, t-butyl hydroperoxide and cumene hydroperoxide. These initiators may be used alone or in combination as a mixture of two or more of them. In a case where the polymerization is carried out by means of e.g. light rays, it is preferred to further incorporate a photopolymerization initiator or a sensitizer. The amount of such a photopolymerization initiator or a sensitizer is usually from 0.001 to 2 parts by weight, preferably from 0.01 to 1 part by weight, per 100 parts by weight of the total amount of the polymerizable components.

To shape the optical material of the present invention, for example, into an ocular lens such as a contact lens or an intraocular lens, conventional shaping methods which are commonly used in this field can be employed. Such conventional methods include, for example, a cutting method and a cast molding method. The cutting method is method wherein, after carrying out polymerization in a suitable mold or container to obtain a base material (polymer) of a rod, block or plate shape, such a base material is processed into a desired shape by mechanical processing such as cutting, grinding or polishing. The cast molding method is a method wherein a mold corresponding to the shape of a desired ocular lens, is prepared, and polymerization of the above-mentioned polymerizable components is carried out in this mold to obtain a molded product, which may further be subjected to mechanical finishing as the case requires.

When it is desired to obtain the optical material of the present invention as a soft material at a temperature around room temperature and such a material is shaped into an ocular lens, it is usually preferred to employ a cast molding method as the shaping method. Such a casting method may, for example, be a spin casting method or a static casting method.

Apart from these methods, a method may preferably be applied to the present invention wherein a monomer capable of forming a hard polymer is impregnated to a soft optical material, followed by polymerization of the monomer to harden the entire material, which is then subjected to cutting, grinding and polishing to obtain a shaped product having a desired shape, and then the hard polymer is removed from the shaped product to obtain a shaped final product (an ocular lens) made of the soft material (JP-A-62-2780241, JP-A-1-11854).

Further, to prepare an intraocular lens, the lens and the support for the lens may separately be prepared, and they may be later bonded to each other. Otherwise, the support portion may be simultaneously (integrally) molded with the lens.

Thus, the hydrophilic crosslinkable compound (A) of the present invention imparts to the polymer, not only excellent hydrophilic property and transparency but also excellent ultraviolet absorbing property, deposit resistance and boiling resistance as well as proper hardness and oxygen permeability, and the optical material of the present invention made of such a polymer will be excellent in these properties.

Now, the crosslinkable compound and the optical material made of such a compound of the present invention will be described in further detail with reference to Examples. However, it should be understood that the present invention is by no means restricted to such specific Examples.

EXAMPLE 1

Synthesis of Crosslinkable Compound (A) (bis[4-(3-methacrylamidophenoxy)phenyl]sulfone)

8.65 g (0.02 mol) of bis[4-(3-aminophenoxy)phenyl] sulfone, 4.44 g (0.044 mol) of triethylamine and 20 g of dichloromethane were stirred in a flask at a temperature of not higher than 5° C.

Then, 4.18 g (0.04 mol) of methacrylic acid chloride was gradually dropwise added into the flask. After completion of the dropwise addition, the content was stirred and reacted at room temperature for two hours.

After completion of the reaction, the reaction solution was filtered and the filtrate was washed sequentially once with 20 ml of a 0.2N hydrochloric acid aqueous solution, once with 20 ml of a saturated sodium hydrogencarbonate aqueous solution and twice with 20 ml of a sodium chloride aqueous solution and then dried over anhydrous magnesium sulfate, followed by filtration.

From the obtained filtrate, the solvent was distilled off under reduced pressure to obtain a crude product. This crude product was separated by silica gel column chromatography (developing solvent: ethyl acetate/hexane (volume ratio)= 1/1 to 2/1) to obtain 2.8 g of the desired product. The yield was 25%.

With respect to the obtained product, the infrared absorption spectrum was measured by a KBr tablet method by means of FT-IR8300 manufactured by Japan Spectroscopic Co., Ltd. As a result, it was found that the following characteristic absorptions were observed.

3366 cm$^{-1}$, 1671 cm$^{-1}$: Absorption attributable to an amide group 1628 cm$^{-1}$: Absorption attributable to vinylidene 1319 cm$^{-1}$, 1151 cm$^{-1}$: Absorption attributable to a sulfonyl group Further, with respect to the obtained product, the $^1$H-NMR spectrum was measured by means of superconductive FT-NMR GEMINI 2000/400 manufactured by Varian Company. As a result, it was found that the following characteristic signals were observed.

| | |
|---|---|
| 2.0 ppm: | Signal attributable to —C$\underline{H}_3$ |
| 5.4 ppm, 5.8 ppm: | Signals attributable to vinylidene proton |
| 6.8 ppm, 7.0 ppm, 7.3 ppm, 7.4 ppm, 7.7 ppm, 7.8 ppm: | Signals attributable to aromatic proton |

From the above results, it was confirmed that the obtained product was bis[4-(3-methacrylamidophenoxy)phenyl] sulfone of the formula:

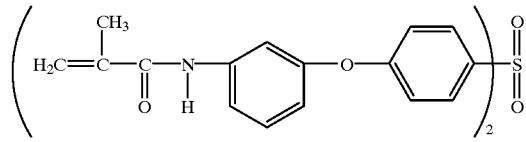

EXAMPLE 2 AND COMPARATIVE EXAMPLES 1 AND 2

Preparation of Oxygen Permeable Hard Optical Material

The polymerizable components as identified in Table 1 and 0.1 part by weight (per 100 parts by weight of the total amount of the polymerizable components) of 2,2'-azobis(2,4-dimethylvaleronitrile (hereinafter referred to as V-65) as a polymerization initiator, were uniformly mixed to obtain a transparent solution This solution was introduced into a glass test tube, then a free-oxygen absorber was provided, and the test tube was then sealed.

Then, the sealed test tube was transferred into a circulation system constant temperature water bath, whereupon polymerization was carried out at 35° C. for 40 hours and at 50° C. for 8 hours. The test tube was then transferred to a circulation system drying oven and heated within a temperature range of from 60 to 120° C. over a period of about 16 hours while gradually raising the temperature, to complete the polymerization to obtain a rod-shaped transparent polymer (optical material) having a diameter of about 15 mm.

The obtained rod-shaped polymer was cut into a desired thickness and subjected to processing by cutting, grinding and polishing to obtain a test specimen. As the physical properties of this specimen, the contact angle, the ultraviolet absorbing ability and the refractive index were examined in accordance with the following methods. The results are shown in Table 1.

(a) Contact Angle

The contact angle (degree) of a dried test specimen having a thickness of 4 mm was measured by an air bubble method at a temperature of 25° C. by means of a goniometer.

(b) Ultraviolet Light Absorbing Ability

Using UV-3100 manufactured by Shimadzu Corporation, the transmittance of a light having a wavelength of 780 to 200 nm was measured in distilled water with respect to a plate-shaped test specimen having a diameter of 12.7 mm and a thickness of 0.2 mm. The wavelength (the cut off point), with which the measured light transmittance became 0%, was examined, whereby the presence or absence of the ultraviolet light absorbing ability was judged.

(c) Refractive Index

Using Abbe refractometer Type 1T manufactured by Atago Co., Ltd., the refractive index (no unit) of a test specimen having a thickness of 4 mm, was measured at a temperature of 25° C. under a relative humidity of 50%.

The abbreviations in Table 1 and subsequent Table 2 represent the following compounds.

BMAS: Bis[4-(3-methacrylamidophenoxy)phenyl]sulfone (which was synthesized in Example 1) represented by the formula:

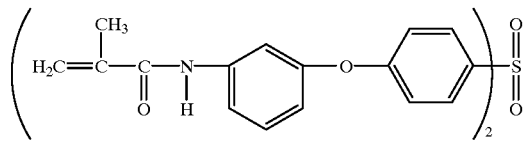

MMA: Methyl methacrylate

SiMA: Tris(trimethylsiloxy)silylpropyl methacrylate

DMAA: N,N-dimethylacrylamide

VBMA: 4-Vinylbenzyl methacrylate

EDMA: Ethylene glycol dimethacrylate

TABLE 1

| Example No. | Polymerizable components (parts) | | | | | Physical properties of the test specimen | | |
|---|---|---|---|---|---|---|---|---|
| | Cross-linkable compound (A) | Monomer (B) | | | | Contact angle | Ultraviolet light absorbing ability (cutoff point | Refractive index |
| | BMAS | MMA | SiMA | VBMA | EDMA | (degree) | (nm)) | (-) |
| 2 | 5 | 60 | 35 | — | — | 40 | 315 | 1.477 |
| Comparative Example 1 | — | 60 | 35 | 5 | — | 60 | 260 | 1.474 |
| Comparative Example 2 | — | 60 | 35 | — | 5 | 60 | 240 | 1.469 |

From the results shown in Table 1, it is evident that when the test specimen in Example 2 wherein the crosslinkable compound (A) was employed, was compared with the test specimens of Comparative Example 1 and 2 wherein in Example 2, conventional crosslinkable monomers were used instead of the crosslinkable compound (A), the test specimen in Example 2 had a substantially small contact angle and a remarkably improved hydrophilic property and yet has a high refractive index and an ultraviolet light absorbing ability.

EXAMPLE 3 AND COMPARATIVE EXAMPLE 3

Preparation of Oxygen Permeable Water-Containinq Soft Optical Material

Transparent polymers (optical materials) were prepared in the same manner as in Example 2 and Comparative Examples 1 and 2 except that in Example 2 and Comparative Examples 1 and 2, the polymerizable components were changed as identified in Table 2, and the amount of V-65 was changed to 0.15 part by weight per 100 parts by weight of the total amount of the polymerizable components, and test specimens were prepared from such polymers. As the physical properties of each test specimen, the water content, the linear swelling ratio and the amount of deposited lipid were examined in accordance with the following methods, and the ultraviolet light absorbing ability and the refractive index were examined in the same manner as in Example 2 and Comparative Examples 1 and 2. The results are shown in Table 2.

(d) Water Content

The weight ($W_0$ (g)) of a test specimen having a diameter of 12 mm and a thickness of 0.5 mm was measured, and this test specimen was immersed in water at 20° C. Then, the weight (W (g)) of the test specimen in an equilibrium water-containing state was measured. Using these measured values, the water content (wt %) at 20° C. was calculated by the following formula.

Water content (wt %)={(W−$W_0$)/W}×100

(e) Linear Swelling Ratio

A test specimen having a diameter of 12 mm and a thickness of 0.2 mm was immersed in water at 20° C., and the diameter (D (mm)) of the test specimen in an equilibrium water-containing state was measured. Using this measured value, the linear swelling ratio (%) at 20° C. was calculated by the following formula.

Linear swelling ratio (%)={(D−12)/D}×100

(f) Amount of Deposited Lipid

Firstly, an artificial ocular lipid (a buffer of pH 7) comprising the following components, was prepared.

| Components | Amount (g) |
|---|---|
| Oleic acid | 0.3 |
| Linolic acid | 0.3 |
| Tripalmitin | 4.0 |
| Cetyl alcohol | 1.0 |
| Palmitic acid | 0.3 |
| Spalmacety | 4.0 |
| Cholesterol | 0.4 |
| Palmitic acid cholesterol | 0.4 |
| Yolk lecithin | 14.0 |

Then, in this artificial ocular lipid, a test specimen having a diameter of 12.7 mm and a thickness of 1 mm, was immersed at 37° C. for 5 hours, followed by rinsing with water. Then, the lipid deposited on this test specimen was extracted with 1 ml of a mixed solvent of ethanol and ethyl ether (ethanol:ethyl ether=3:1 (volume ratio)).

To 200 $\mu$l of the obtained lipid extract, 1 ml of concentrated sulfuric acid was added, and 3 mg of vanillin and 2 ml of phosphoric acid were mixed, whereupon the absorbance of this solution at a wavelength of 540 nm was measured by means of an absorbance meter (UV-2400PC, manufactured by Shimadzu Corporation).

On the other hand, the absorbance was measured in the same manner as described above, except that as a control, a physiological sodium chloride aqueous solution was used instead of the above artificial ocular lipid.

Further, using the above artificial ocular lipid, the absorbance was measured at various concentrations, and together with the absorbance of the above control, a calibration curve was prepared.

By comparing the absorbance of the lipid extract of the above test specimen with this calibration curve, the amount of deposited lipid per unit area (mg/cm$^2$) was obtained.

TABLE 2

| | Polymerizable components (parts) | | | | Physical properties of the test specimen | | | | |
| --- | --- | --- | --- | --- | --- | --- | --- | --- | --- |
| | Cross-linkable compound (A) | Monomer (B) | | | Water content | Linear swelling ratio | Ultraviolet light absorbing ability cutoff | Refractive index | Amount of deposited lipid |
| Example No. | BMAS | DMMA | SiMA | EDMA | (wt %) | (%) | point (nm)) | (—) | (mg/cm$^2$) |
| 3 | 5 | 45 | 50 | — | 38 | 17.5 | 305 | 1.439 | 0.53 |
| Comparative Example 3 | — | 45 | 50 | 5 | 30 | 12.5 | 230 | 1.431 | 0.62 |

From the results shown in Table 2, it is evident that when the test specimen in Example 1 wherein the crosslinkable compound (A) was employed, was compared with the test specimen in Comparative Example 3 wherein in Example 3, a conventional crosslinkable monomer was employed instead of employing the crosslinkable compound (A), the test specimen in Example 3 had a small amount of deposited lipid thus being excellent in the lipid contamination resistance and a high refractive index, and yet had an ultraviolet light absorbing ability.

As described in the foregoing, the crosslinkable compound of the present invention is hydrophilic and capable of imparting excellent hydrophilicity, transparency, ultraviolet light absorbing property, deposit resistance and boiling resistance as well as proper hardness and oxygen permeability, to a polymer obtainable by using it.

Accordingly, the optical material of the present invention prepared by employing such a crosslinkable compound is excellent in hydrophilicity, transparency, ultraviolet light absorbing property, deposit resistance and boiling resistance and yet has proper hardness and oxygen permeability.

I claim:

1. A crosslinkable compound of the formula (I):

$$\left( R_1 - N - R_2 \right)_2 - S \atop H \qquad\qquad O$$ (I)

wherein $R_1$ is a group of the formula:

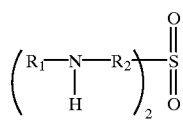

wherein $R_3$ is a hydrogen atom or a methyl group; a group of the formula:

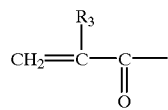

wherein $R_4$ is a hydrogen atom or a methyl group, and $R_5$ is a direct bond, a group of the formula:

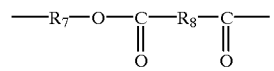

wherein $R_7$ is a $C_{1-5}$ alkylene group, and $R_8$ is —CH$_2$—CH$_2$—, —CH=CH—, a group of the formula:

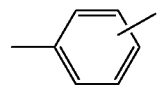

or a group of the formula:

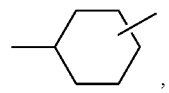

or a group of the formula:

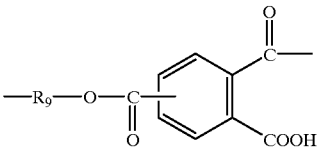

wherein $R_9$ is a $C_{1-5}$ alkylene group; or a group of the formula:

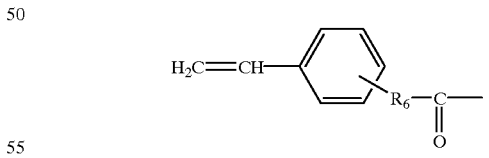

wherein $R_6$ is a $C_{1-3}$ alkylene group; and $R_2$ is a group of the formula:

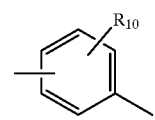

wherein $R_{10}$ is a methyl group, a methoxy group, a chlorine atom or a hydroxyl group; or a group of the formula:

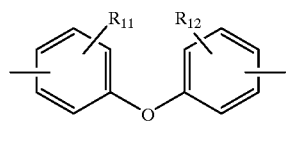

wherein each of $R_{11}$ and $R_{12}$ which are independent of each other, is a hydrogen atom, a methyl group, a methoxy group, a chlorine atom or a hydroxyl group.

2. An optical material made of a polymer obtained by polymerizing polymerizable components comprising the crosslinkable compound as defined in claim 1 and at least one monomer having an unsaturated double bond copolymerizable with the crosslinkable compound.

3. The optical material according to claim 2, wherein the amount of the crosslinkable compound is from 0.01 to 30 wt % of the polymerizable components.

4. The crosslinkable compound of claim 1, of the formula

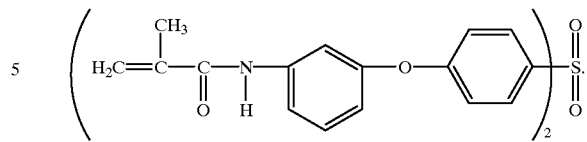

5. The optical material according to claim 2, wherein said crosslinkable compound is of the formula

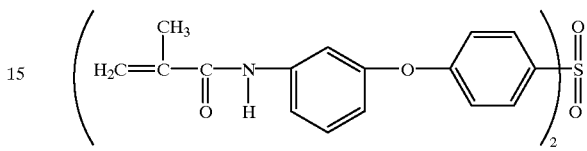

6. The optical material according to claim 5, wherein said monomer having an unsaturated double bond copolymerizable with the crosslinkable compound is at least one selected from the group consisting of methyl methacrylate, tris (trimethylsiloxy)silylpropyl methacrylate, N,N-dimethylacrylamide, 4-vinylbenzyl methacrylate and ethylene glycol dimethacrylate.

* * * * *